United States Patent [19]

Winter et al.

[11] 4,203,734
[45] May 20, 1980

[54] METHOD AND APPARATUS FOR THE SELECTIVE ADSORPTION OF VAPOROUS OR GASEOUS IMPURITIES FROM OTHER GASES

[75] Inventors: Karl Winter, Dortmund-Sölde; Günter Staschik, Halingen, both of Fed. Rep. of Germany

[73] Assignee: Ceagfilter und Entstaubungstechnik GmbH, Dortmund, Fed. Rep. of Germany

[21] Appl. No.: 858,384

[22] Filed: Dec. 7, 1977

Related U.S. Application Data

[63] Continuation of Ser. No. 738,537, Nov. 3, 1976, abandoned.

[30] Foreign Application Priority Data

Mar. 16, 1976 [DE] Fed. Rep. of Germany ....... 2610963

[51] Int. Cl.² ............................................. B01D 53/04
[52] U.S. Cl. ........................................... 55/26; 55/27; 55/62; 55/74; 55/180; 55/387
[58] Field of Search ............... 55/23, 25, 26, 27, 59, 55/61, 62, 74, 75, 179, 180, 387, 389, 28, 208

[56] References Cited

U.S. PATENT DOCUMENTS

| | | | |
|---|---|---|---|
| 1,548,280 | 8/1925 | Ray | 55/74 |
| 1,815,554 | 7/1931 | Engelhardt | 55/59 |
| 1,959,389 | 5/1934 | Shoosmith | 55/180 |
| 2,340,398 | 2/1944 | MacMullin | 55/71 X |
| 2,428,885 | 10/1947 | Luaces | 55/59 X |
| 3,102,013 | 8/1963 | Skarstrom | 55/58 X |
| 3,150,942 | 9/1964 | Vasan | 55/62 X |
| 3,221,476 | 12/1965 | Meyer | 55/28 |
| 3,225,516 | 12/1965 | Smith et al. | 55/62 X |
| 3,534,529 | 10/1970 | Mattia | 55/74 X |
| 3,905,783 | 9/1975 | Winter et al. | 55/74 X |

Primary Examiner—Robert H. Spitzer
Attorney, Agent, or Firm—Herbert L. Lerner

[57] ABSTRACT

Purification of a stream of air or gas containing a mixture of vaporous or gaseous impurities of different volatilities and selective adsorption and recovery of the impurities in adsorption filters by passing the stream containing impurities through at least two adsorption filters connected in tandem, maintaining the temperature of adsorption in the first adsorption filter sufficiently high to selectively adsorb the impurities of low volatility, passing the stream containing impurities of higher volatility from the first adsorption filter through at least the second adsorption at a temperature lower than the temperature in the first adsorption filter to selectively adsorb the impurities of higher volatility. Temperature of adsorption may be obtained by passing the stream through a heat exchanger preceding the filter.

4 Claims, 2 Drawing Figures

METHOD AND APPARATUS FOR THE SELECTIVE ADSORPTION OF VAPOROUS OR GASEOUS IMPURITIES FROM OTHER GASES

This is a continuation of application Ser. No. 738,537, filed Nov. 3, 1976, now abandoned.

CROSS-REFERENCES TO RELATED APPLICATIONS

U.S. application Ser. No. 738,569, filed for Purifying an Air or Gas Stream Containing Combustible Vaporous or Gaseous Impurities, on Nov. 3, 1976; and U.S. application Ser. No. 738,468, filed for Apparatus for Sorption Filters and Method for Operating them, on Nov. 3, 1976.

BACKGROUND OF THE INVENTION

1. Field of the Invention

This invention relates to purification of air or gas and more particularly refers to a new and improved method and apparatus for the selective adsorption of individual vaporous or gaseous impurities from air or other gases.

2. Description of the Prior Art

One problem of gas purification technology, especially of air purification technology, is the separation of vaporous or gaseous impurities from a stream of gas. It is known to solve such problems by means of adsorption techniques. It is likewise known to utilize adsorption filters for this purpose. It is also known to accomplish the separation of such impurities by thermal combustion which may take place in the flame, as well as by means of a catalyst. It is also known to store adsorbable impurities in an adsorption filter and to recover them after desorption, for instance through condensation, or to burn them after the necessary combustion air has been added. A disadvantage of these methods is that there is no selective effect and thus, mixtures of vapors or gaseous impurities can be precipitated but not selectively separated. The problem of separation is concerned with practical applications as for example in painting technology. Separating the paint solvents used is not only a necessity with respect to keeping the air clean but the recovery subsequent to the separation can result in substantial economic advantages if these recovered solvents can be reintroduced into the painting process at low cost. In the exhaust air of painting lines, there are, in addition to solvents, also softeners with a higher boiling point than the solvents. The recovery of the softener or plasticizer can as a rule be dispensed with. Recovery of the softeners is generally uneconomical and may cause contamination of the solvents sought to be recovered.

SUMMARY OF THE INVENTION

An object of the present invention is to provide an efficient system of selective separation of vaporous or gaseous impurities from gases and the recovery of valuable impurity components.

With the foregoing and other objects in view, there is provided in accordance with the invention method for the selective adsorption in adsorption filters of a mixture of vaporous or gaseous impurities of different volatilities in a stream of air or gas which includes passing the stream of air or gas containing the mixture of vaporous or gaseous impurities of different volatilities through at least two adsorption filters connected in tandem, maintaining the temperature of adsorption in the first adsorption filter at a temperature sufficiently high to selectively adsorb the impurities of low volatility with passage of the stream containing impurities of higher volatility through the first adsorption filter, and passing the stream containing impurities of higher volatility through at least the second adsorption filter at a temperature lower than the temperature in the first adsorption filter to selectively adsorb the impurities of higher volatility.

In accordance with the invention there is provided apparatus for the selective adsorption in adsorption filters of a mixture of vaporous or gaseous impurities of different volatilities in a stream of air including at least two adsorption filters connected in tandem, means for maintaining the temperature of adsorption in the first adsorption filter at a temperature sufficiently high to selectively adsorb the impurities of low volatility with passage of the stream containing impurities of higher volatility through the first adsorption filter, and means for maintaining the temperature of adsorption in the second adsorption filter at a temperature lower than the temperature in the first adsorption filter to selectively adsorb impurities of higher volatility.

BRIEF DESCRIPTION OF THE DRAWINGS

Other features which are considered as characteristic for the invention are set forth in the appended claims.

Although the invention is illustrated and described herein as embodied in method and apparatus for the selective adsorption of vaporous or gaseous impurities from other gases, it is nevertheless not intended to be limited to the details shown, since various modifications may be made therein without departing from the spirit of the invention and within the scope and range of equivalents of the claims.

Figure 1:
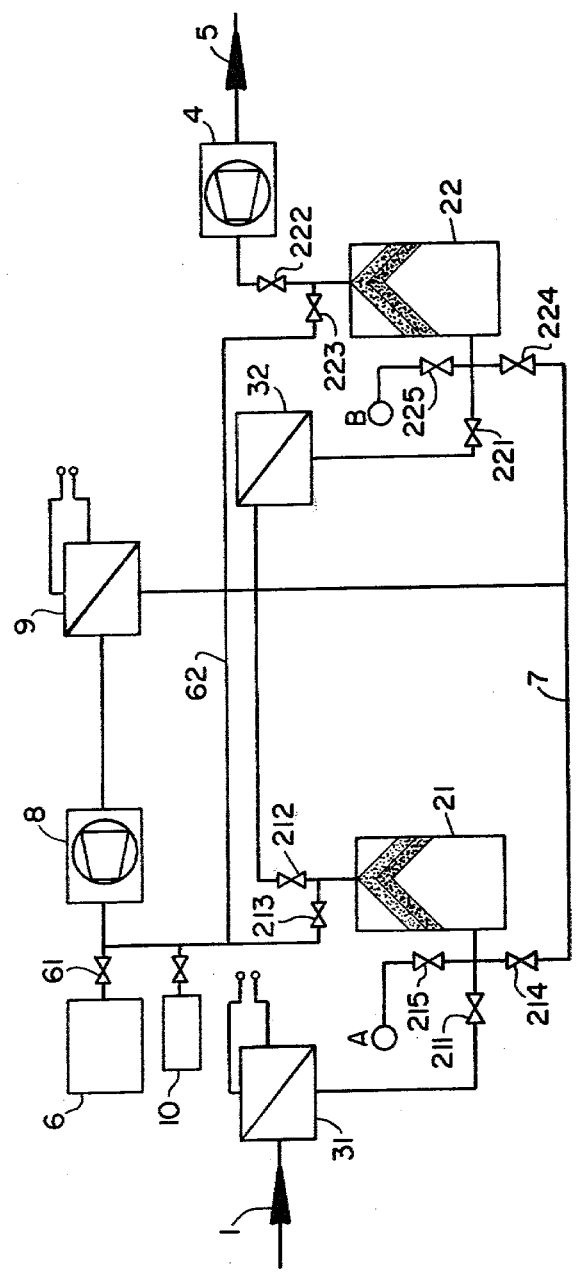
Figure 2:
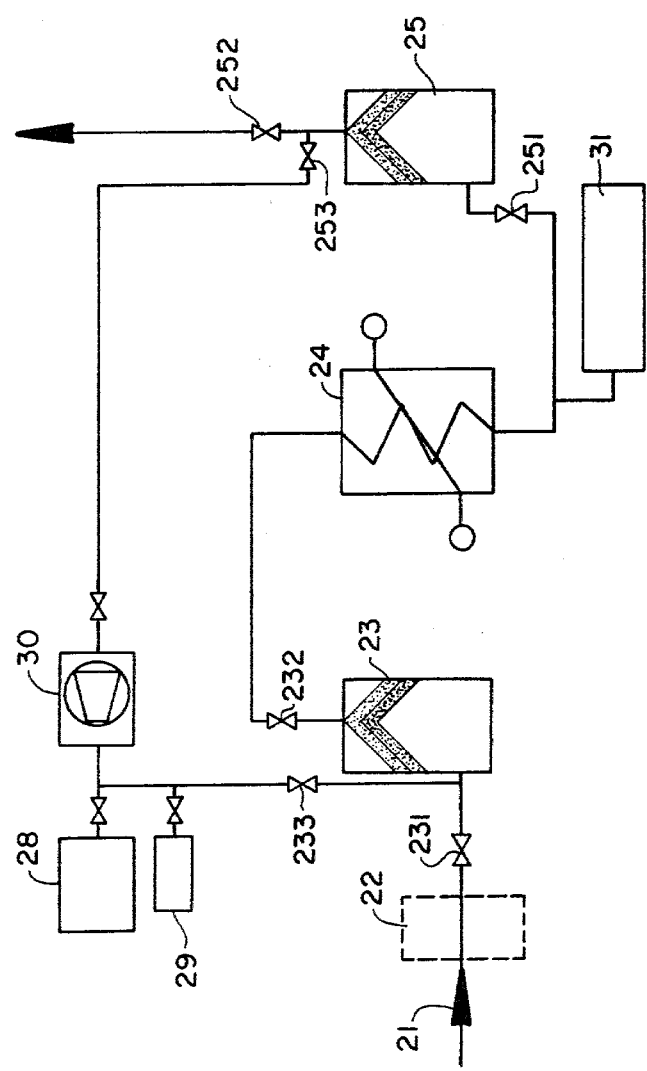

The invention, however, together with additional objects and advantages thereof will be best understood from the following description when read in connection with the accompanying drawings, in which:

FIG. 1 diagrammatically illustrates one embodiment for selectively adsorbing impurities of different volatilities from gas containing them; and FIG. 2 diagrammatically illustrates a simplified form of selectively adsorbing and desorbing impurities.

DETAILED DESCRIPTION OF THE INVENTION

The separation by means of adsorption is carried out in such a manner that at least two sorption filters are connected in tandem and are operated at different temperatures, with the temperature of the gas to be purified being reduced from one sorption stage to the other by interposed coolers.

Referring to FIG. 1, the gas to be purified is fed to the sorption filter 21 through the feedline 1 at the temperature corresponding substantially to the conditions under which the gas collects. At the start of operation, the valve 211 is opened, and the valves 214 and 215 are closed. If the temperature of the gas entering feedline 1 is to be changed before it enters the sorption filter 21, a first heat exchanger 31 is connected into the line 1. This heat exchanger 31 has a fluid such as steam or cold water flowing through it to raise or lower the temperature of the gas entering through feedline 1 and passing through heat exchanger 31 to the temperature desired for the first sorption stage 21. The gas is selectively purified in the first gas sorption filter 21 by adsorption of low volatile impurities in the gas. The adsorption temperature in filter 21 is sufficiently high to permit passage through filter 21 of the air or gas and substantially all of the highly volatile impurities but the temperature should be sufficiently low to retain substantially all the low volatile component. The gas from sorption filter 21 leaves through the valve 212, while the valve 213 is closed. The gas then flows through the heat exchanger 32 which brings it to the temperature at which the adsorption in the second stage is to take place, which temperature is lower than the temperature of adsorption in filter 21. The gas then flows through the open valve 221 to the second sorption filter 22, wherein impurities of higher volatility are adsorbed, and it leaves this purification stage through the open valve 222. This may be followed further by as many sorption stages with the associated coolers and corresponding valves as desired. FIG. 1 shows the first two stages. The purified gas is pumped by the blower 4 through the entire cooler-sorption filter chain and is conveyed via the gas discharge 5 for further processing or discharge into the open atmosphere. Blower 4 may be dispensed with if the gas entering feedline 1 is under sufficient pressure to overcome pressure drop and propel it through the entire cooler-sorption filter chain.

In the individual sorption filters 21, 22 and in those which may follow the second filter but are not shown in FIG. 1, the materials are stored and become loaded at the temperature prevailing in each stage due to the respective adsorption isotherms. It is unavoidable that initially substances, for instance, of lower boiling point and higher volatility which properly should be separated only in one of the following stages, are adsorbed in the first stage. However, with advancing loading, these are displaced by the impurities of lower volatility which are to be separated in this stage. Thereby, if the individual sorption filters are saturated to a preterminded level with the selected impurity, a nearly uniform sorbate can be removed from the sorbent by an inert gas desorption in known manner, as described, for example, in U.S. Pat. Nos. 3,853,985; 3,905,783 and 3,930,803. For this purpose, the inert gas generator 6 may be connected to the inert gas inlet valves of the sorption filters 213, 233 and, as applicable, in a corresponding manner for further stages via a line 62. As with this procedure the stage to be desorbed is interrupted for the passage of gas because the valves for feeding-in the gas to be purified, 211, 221 etc. and those for the discharge of the gas purified in this stage, 212, 222 etc. are closed, parallel-connected alternate sorption filters, not shown can insure continuous operation if during desorption the alternate filters are switched into adsorption, and during the desorption of the parallel sorption filter the previously desorbed filter is switched back to adsorption. Thus it is possible to alternate filters in each stage of adsorption. As a practical matter, however, we have found each measure need not be employed in the separation stage for low volatile impurities since such stage will usually run for extended periods, as long as 10 days or more, without requiring desorption, generally because the quantity of such impurities in the gas is small. The highly volatile components of the impurities of the gas which are separated at a relatively low temperature require more frequent desorption, usually every two or three days.

The inert gas from the stages which are being desorbed leaves the sorption filters via valves 214 in the first stage, 224 in the second stage or via the corresponding ones in the other stages and is sent through a collecting line 7 and returned to the inert gas inlet by a blower 8. The inert gas generated in the inert gas generator 6 is admixed with the returned inlet gas from blower 8. In the cooler 9 which advantageously precedes the blower 8, an adjustment to the temperature is made so that after being mixed with the hot inert gas, the gas mixture has the temperature required for the desired desorption conditions. The gas so conditioned serves for the desorption and the flushing of the desorbate from the sorption filter, as described, for example, in German Published Prosecuted Application No. P 22 48 267.

At the points A and B, the excess gas coming from the stage being desorbed can be fed to the process to be associated with that stage, after the corresponding valves 215 for A, and 225 for B, etc. are opened. Thus, after-combustion of the desorbate, for example, may follow at A, while a recovery system for the desorbate follows at B. If all substances selectively separated in the individual stages are fed to the same post-treatment process, the removal of the excess gas from the inert gas loop can be limited to one take-off point. A further advantageous implementation of the method relates to the cooling of the adsorbers 21, 22 etc. which are highly heated during the desorption. In order to prevent ignition if combustible sorbents such as activated carbon are used, an auxiliary protective gas generator 10 may keep the entire inert gas system including the just desorbed adsorber under pressure in such a manner that the volume reduction of the inert gas due to the lowering of the temperature is more than compensated. This auxiliary protective gas generator 10 can be used for inertization, of course, also prior to a desorption.

In the simplest case the separation of two components is involved which are contained as impurities in a stream of gas. For this purpose the gas to be purified, which flows in via the line 12, is conditioned, according to the schematic process of FIG. 2, if it arrives at an arbitrary temperature, in a preceding heat exchanger 122 in such a manner that it assumes the temperature at which the first sorption process takes place. This conditioning in the first heat exchanger for possible cooling of the gas can also be replaced by cooling through humidification in a humidification cooler. If the gas to be purified arrives at a suitable temperature, the conditioning can be omitted, of course. The gas which has been brought to the suitable temperature for adsorption is now fed to the first gas sorption stage 23, the valves 231 and 232 being open.

The gas purified of the first impurity now flows to a cooler 24, in which the temperature of the gas is reduced so that at this temperature an adsorption isotherm advantageous for the adsorption of the second impurity is obtained. This cooling is advantageously performed in a heat exchanger. The thus conditioned gas now flows to the second adsorber 25 in which the second component is adsorbed until this adsorber 25 is saturated, i.e. charged to a predetermined level with impurities, which level is below the point at which the impurities may be carried through the adsorber. If the concentrations of the two impurities are greatly different, the time of saturation is first reached by that adsorber which separates-out the impurity present with the highest concentration. In order to make it operative again, it must be desorbed. In the simplest case, the entire system is desorbed for this purpose; this procedure is particularly advantageous if the adsorbed impurities are further processed together. According to the invention a desorption loop is used for this purpose, in which the desorption temperature can be adjusted. This setting of the temperature becomes possible by providing in the desorption loop gas cooling which takes place in the existing cooler 24. With this procedure it is to be noted, however, that the impurities separated in the first adsorber 23 require a higher desorption temperature than those which are adsorbed in the adsorber 25. For the sake of simplification, desorption by the counterflow principle is therefore dispensed with here and both adsorbers 23 and 25 are desorbed with a flow in the same direction after the valves 231 and 252 are closed. Through this connection it is possible to dispense with the cooler in the inert gas loop and to reduce the capital expenditure. The desorption starts with the feeding of inert gas by the inert gas generator 28. In special cases it may be advantageous to perform a preceding inertization by means of the auxiliary protective gas generator 29. The inert gas loop blower 30 transports the inert gas in the closed circuit, with the valves 233 and 253 open. At any desired point of the desorption loop the desorbate-containing excess gas produced is taken off. This point, should advantageously be arranged in the loop where overpressure of suitable magnitude is present. The excess gas flows to the post-combustion device 131, but it can also be replaced by a condensation stage or by another gas utilization stage. In the heat exchanger 24 the inert gas conducted in the loop is adapted to the desorption temperature for the adsorber 25, while an adjustment or control of the freshly generated inert gas from the inert gas generator 28 allows adjustment of the desorption temperature for the adsorber 23. Gas samples may be taken at various points in the plant during operation, as is common practice, to make certain of smooth operation. The temperature of adsorption to selectively remove a single component may be readily determined by sampling a gas stream leaving the adsorption stage, prior to or at the start of an operation, to make certain that the component to be desorbed does not carry over into the gas but remains behind in the adsorption filter. Adjustment of the temperature upwards or downwards can then be made to effect selective adsorption. We have found that generally selective adsorption is covered not solely by a single temperature, but by a range covering a spread of 5° C. to as much as 10° C. or more. Of course the temperature of adsorption need be determined only once for each gas composition to be purified.

The following examples illustrate the present invention.

EXAMPLE 1

In a production installation, work pieces are coated with polyvinylchloride (PVC) containing trichloroethylene (Tri) and Di(2-ethylhexyl)phthalate or dioctylphthalate (DOP). During the subsequent drying, DOP and Tri are liberated. The DOP, as softener, comes here from the PVC and the Tri is the solvent.

The exhaust air from the installation contains on the average 0.12 g/m$^3$ DOP and 5.5 g/m$^3$. The temperature of the exhaust gas varies between 60° and 110° C.

(a) For purposes of comparison, purification of the exhaust air was carried out in the usual manner by passing it through activated-carbon adsorbers, but failed due to the following difficulties:

When the adsorbers were operated at the prevailing temperature, only very short service life times could be achieved by the adsorbers for adsorbing the trichloroethylene. After the temperature of the gas leaving the adsorber was lowered by coolers to 40° C., a dense plume of condensed DOP, which was not precipitated, was suspended in the gas leaving the adsorber.

(b) Pilot tests were carried out to demonstrate the efficacy of the present invention. A partial air stream of 250 m$^3$/h was taken off and led to two activated/carbon adsorbers with 20 kg activated carbon each. The adsorbers were connected in tandem and a cooler interposed, which cooled the air strea from 95° C. to 35° C.

In this manner, the first adsorber was able to reach a service life of 250 hours, until the formation of fog behind the cooler indicated the break-through of the DOP.

The adsorption time of the second adsorber reached three hours. In this manner, DOP and Tri were separated practically completely. As a further advantage it turned out that the regeneration could now also be adapted very well to the pure substances which were now present separately in two adsorbers. While the first adsorber had to be desorbed only every 250 hours, albeit at 350° C., the second stage could be desorbed every three hours under mild conditions with inert gas or steam at temperatures below 200° C.

It should further be mentioned that the cooler between the adsorbers remains free of wetting by heavy volatile substances, as the latter are separated-out in the first adsorber. The carryover of low volatile substances into a cooler tends to plug-up the cooler.

Since the relatively small amounts of DOP produced every 250 hours do not appear to make recovery economical, the desorbate of the first adsorber is burned.

The desorbate of the second state is cooled, condensed and separated from the water. The second stage can be operated without interruption by employing two adsorbers connected in parallel and which adsorbers are alternatingly loaded and desorbed. Thus, the trichloroethylene accumulated during adsorption can be recovered practically completely.

EXAMPLE 2

In the production of synthetic resins, relatively large amounts of ethyl alcohol (ethanol) and small amounts of phenol are released.

Adsorptive purification of the exhaust gas containing these impurities has heretofore failed because of the same difficulties as in Example 1. At higher adsorption temperatures, the ethanol could be held back only to an insufficient degree and, upon cooling, parts of the phenol, which was not separated by the adsorber, condensed to form a bluish fog. This led to great annoyance in the neighborhood due to odors from the exhaust gas.

In accordance with the invention, two adsorption stages with intermediate cooling were connected in tandem in such a manner that the first stage adsorbs the phenol from the vaporous phase at 85° C. and the second stage reaches sufficient take-up capacity for ethyl alcohol at 30° C. As in Example 1, the second stage is desorbed with inert gas (or also with steam) at temperatures below about 300° C. and the ethanol recovered. The first stage is subjected after an extended period of operation (1 month) to a reactivating desorption at 750° C., as the customary desorption leaves excessively large residual loading.

The embodiments of the invention in which an exclusive property or privilege is claimed are defined as follows:

1. Method for the selective adsorption in adsorption filters of a mixture of vaporous impurities of different volatilities in a stream of exhaust air which comprises passing said stream of exhaust air containing said mixture of vaporous impurities of different volatilities through at least two adsorption filters connected in tandem with each filter containing activated carbon as the adsorption medium, maintaining the temperature of adsorption in the first activated carbon adsorption filter at a temperature sufficiently high to selectively adsorb the vaporous impurities of low volatility with passage of said stream of exhaust air containing vaporous impurities of higher volatility in direct contact with and through said first activated-carbon adsorption filter, and passing said stream of exhaust air containing vaporous impurities of higher volatility in direct contact with and through at least said second activated-carbon adsorption filter at a temperature lower than the temperature in the first activated-carbon adsorption filter to selectively adsorb said vaporous impurities of higher volatility, maintaining the temperature of adsorption to effect selective adsorption in each of said two adsorption filters by passing said stream in indirect heat exchange with a fluid at a different temperature prior to passing said stream into each of said two adsorption filters, individually desorbing each adsorption filter by passage of an inert gas through the filter after it has attained a predetermined loading of the vaporous impurities and discharging the inert gas containing desorbate as vaporous impurities separately from each individually desorbed adsorption filter the first of said two adsorption filters being desorbed at a longer time interval than the second, and recovering the desorbate containing the impurities of high volatility from the second adsorption filter separate and apart from the desorbate containing the impurities of low volatility from the first adsorption filter.

2. Method according to claim 1, wherein the inert gas containing desorbate as vaporous impurities of higher volatility is cooled to condense the desorbate as liquid and the condensate separated from the inert gas and recovered and wherein oxygen is admixed with the inert gas containing desorbate as vaporous impurities of low volatility and the desorbate burned.

3. Apparatus for the selective adsorption in adsorption filters of a mixture of vaporous impurities of different volatilities in a stream of exhaust air comprising at least two adsorption filters connected in tandem with each filter containing activated carbon as the adsorption medium, means for maintaining the temperature of adsorption in the first activated carbon adsorption filter at a temperature sufficiently high to selectively adsorb the vaporous impurities of low volatility with passage of said stream containing vaporous impurities of higher volatility in direct contact with and through said first activated carbon adsorption filter, and means for maintaining the temperature of adsorption in said second activated carbon adsorption filter through which the exhaust air stream containing vaporous impurities then passes in direct contact, at a temperature lower than the temperature in the first activated carbon adsorption filter to selectively adsorb vaporous impurities of higher volatility, wherein said means for maintaining the temperature of adsorption in each of said two adsorption filters is a heat exchanger preceding each of said filters, through which said stream passes in indirect heat exchange with a fluid at a different temperature, and including means for generating an inert gas, and means for passing said inert gas individually to each adsorption filter to individually desorb the filter after it has attained a predetermined loading of the vaporous impurities with the first of said two adsorption filters being desorbed at a longer time interval than the second, and means for discharging the inert gas containing desorbate as vaporous impurities separately from each individual desorbed adsorption filter and recovering the desorbate of high volatility from the second adsorption filter separate and apart from the desorbate containing the impurities of low volatility from the first adsorption filter.

4. Apparatus according to claim 3, including cooling means to condense as liquid the desorbate as vaporous impurities of higher volatility in the inert gas and means for separating and recovering the liquid condensate from the inert gas, and including means for introducing oxygen in admixture with the inert gas containing desorbate as vaporous impurities of low volatility, and furnace means for burning said desorbate in said inert gas.

* * * * *